United States Patent
Bencheikh et al.

(10) Patent No.: US 12,451,671 B2
(45) Date of Patent: Oct. 21, 2025

(54) ELEMENT, METHOD FOR PRODUCING SAME AND ORGANIC SEMICONDUCTOR LASER DIODE

(71) Applicant: KOALA Tech Inc., Fukuoka (JP)

(72) Inventors: Fatima Bencheikh, Fukuoka (JP); Takashi Fujihara, Fukuoka (JP); Jean Charles Maurice Ribierre, Fukuoka (JP); Ryutaro Komatsu, Fukuoka (JP); Chihaya Adachi, Fukuoka (JP); Kento Takahashi, Fukuoka (JP); Nobuhiro Takeishi, Fukuoka (JP)

(73) Assignee: KOALA Tech Inc., Fukuoka (JP)

( * ) Notice: Subject to any disclaimer, the term of this patent is extended or adjusted under 35 U.S.C. 154(b) by 716 days.

(21) Appl. No.: 17/780,253

(22) PCT Filed: Nov. 27, 2020

(86) PCT No.: PCT/JP2020/044186
§ 371 (c)(1),
(2) Date: May 26, 2022

(87) PCT Pub. No.: WO2021/107083
PCT Pub. Date: Jun. 3, 2021

(65) Prior Publication Data
US 2022/0416513 A1 Dec. 29, 2022

(30) Foreign Application Priority Data
Nov. 27, 2019 (JP) ................................ 2019-214757

(51) Int. Cl.
*H01S 5/00* (2006.01)
*H01S 3/207* (2006.01)
(Continued)

(52) U.S. Cl.
CPC .............. *H01S 5/187* (2013.01); *H01S 3/207* (2013.01); *H01S 3/2358* (2013.01); *H01S 5/026* (2013.01);
(Continued)

(58) Field of Classification Search
CPC .......... H01S 5/36; H01S 3/207; H01S 3/2358; H01S 5/026; H01S 5/0262; H01S 5/041;
(Continued)

(56) References Cited

U.S. PATENT DOCUMENTS 6,111,902 A * 8/2000 Kozlov ................... H01S 5/36
372/39
7,667,391 B2 * 2/2010 Duarte ................ H10K 50/85
313/506
(Continued)

FOREIGN PATENT DOCUMENTS

| | | |
|---|---|---|
| CN | 101388523 A | 3/2009 |
| DE | 10162783 A1 | 7/2003 |

(Continued)

OTHER PUBLICATIONS

Extended European Search Report dated Aug. 9, 2023, from corresponding European patent application No. 20893289.7.
(Continued)

*Primary Examiner* — Kinam Park
(74) *Attorney, Agent, or Firm* — Troutman Pepper Locke LLP

(57) ABSTRACT

Disclosed are an element comprising a substrate and at least two different optoelectronic devices, wherein the at least two different optoelectronic devices are monolithically fabricated on the substrate; and a method for producing the same. Also disclosed is an organic semiconductor laser diode comprising a substrate, an insulating grating, a first electrode, an organic layer and a second electrode in this order.

16 Claims, 8 Drawing Sheets

(51) Int. Cl.
  *H01S 3/23* (2006.01)
  *H01S 5/026* (2006.01)
  *H01S 5/04* (2006.01)
  *H01S 5/187* (2006.01)
  *H01S 5/36* (2006.01)
  *H01S 5/40* (2006.01)
  *H10K 59/00* (2023.01)
  *H01S 5/042* (2006.01)

(52) U.S. Cl.
  CPC ............ *H01S 5/0262* (2013.01); *H01S 5/041* (2013.01); *H01S 5/36* (2013.01); *H01S 5/4087* (2013.01); *H10K 59/00* (2023.02); *H01S 5/04256* (2019.08)

(58) Field of Classification Search
  CPC .... H01S 5/187; H01S 5/4087; H01S 5/04256; H10K 59/00
  See application file for complete search history.

(56) References Cited

U.S. PATENT DOCUMENTS

| | | | |
|---|---|---|---|
| 2002/0171088 A1* | 11/2002 | Kahen | H01S 3/0915 257/89 |
| 2003/0091085 A1 | 5/2003 | Northrup et al. | |
| 2004/0004988 A1* | 1/2004 | Cok | H01S 3/0915 372/70 |
| 2004/0101008 A1 | 5/2004 | Kurtz et al. | |
| 2005/0025203 A1* | 2/2005 | Kahen | H01S 5/423 372/39 |
| 2005/0047458 A1* | 3/2005 | Nomura | H01S 5/36 372/39 |
| 2005/0062903 A1 | 3/2005 | Cok | |
| 2005/0104075 A1* | 5/2005 | Evans | H01S 5/36 257/85 |
| 2009/0005249 A1 | 1/2009 | Myers et al. | |
| 2009/0052491 A1 | 2/2009 | Nomura et al. | |
| 2009/0135874 A1 | 5/2009 | Liu | |
| 2010/0054294 A1* | 3/2010 | Yukawa | H01S 3/168 372/53 |
| 2011/0069732 A1 | 3/2011 | Smith | |
| 2011/0229073 A1 | 9/2011 | Sirringhaus et al. | |
| 2016/0130138 A1* | 5/2016 | Bulovic | H10D 48/50 438/32 |
| 2020/0028331 A1* | 1/2020 | Sandanayaka | H01S 5/026 |

FOREIGN PATENT DOCUMENTS

| | | |
|---|---|---|
| DE | 102010045782 A1 | 3/2012 |
| DE | 102014207723 A1 | 10/2015 |
| EP | 1035623 A1 | 9/2000 |
| JP | H10-294527 A | 11/1998 |
| JP | 2000182764 A | 6/2000 |
| JP | 2005020002 A | 1/2005 |
| JP | 2007501523 A | 1/2007 |
| JP | 2008524870 A | 7/2008 |
| JP | 2013518429 A | 5/2013 |
| KR | 10-2019-0112258 A | 10/2019 |
| TW | 201836225 A | 10/2018 |
| WO | 2005013447 A1 | 2/2005 |
| WO | 2006068883 A1 | 6/2006 |
| WO | 2011093883 A1 | 8/2011 |
| WO | 2018/147470 A1 | 8/2018 |

OTHER PUBLICATIONS

International Preliminary Report on Patentability of Chapter I, i.e., International SearchOpinion which we received from the WIPO dated May 17, 2022.
International Search Report and Search Opinion dated Feb. 9, 2021.
Office Action dated Aug. 5, 2024 from Taiwanese patent application No. 109141761 with its English Translation.
Office Action dated Oct. 22, 2024 issued in the corresponding Japanese patent application No. 2022-528541 with its English Machine Translation.
European Partial Search Report dated May 8, 2023 issued in the corresponding European patent application No. 20893289.7.
Reufer et al., "Low-threshold polymeric distributed feedback lasers with metallic contacts", Applied Physics Letters, vol. 84, No. 17, 2004, pp. 3262-3264.
Office Action dated Dec. 31, 2024 issued in the corresponding Chinese patent application No. 202080075608.4 with its English Translation.
Office Action dated Jan. 21, 2025 issued in the corresponding Japanese patent application No. 2022-528541 with its English machine Translation.
Office Action dated May 12, 2025 issued in the corresponding Taiwanese patent application No. 114105320 with its English Translation.
Office Action dated Jul. 1, 2025 issued in the corresponding Korean patent application No. 10-2022-7014520 with its English Machine Translation.
Office Action dated Jul. 8, 2025, issued in the corresponding Chinese patent application No. 202080075608.4 with its English Translation.

* cited by examiner

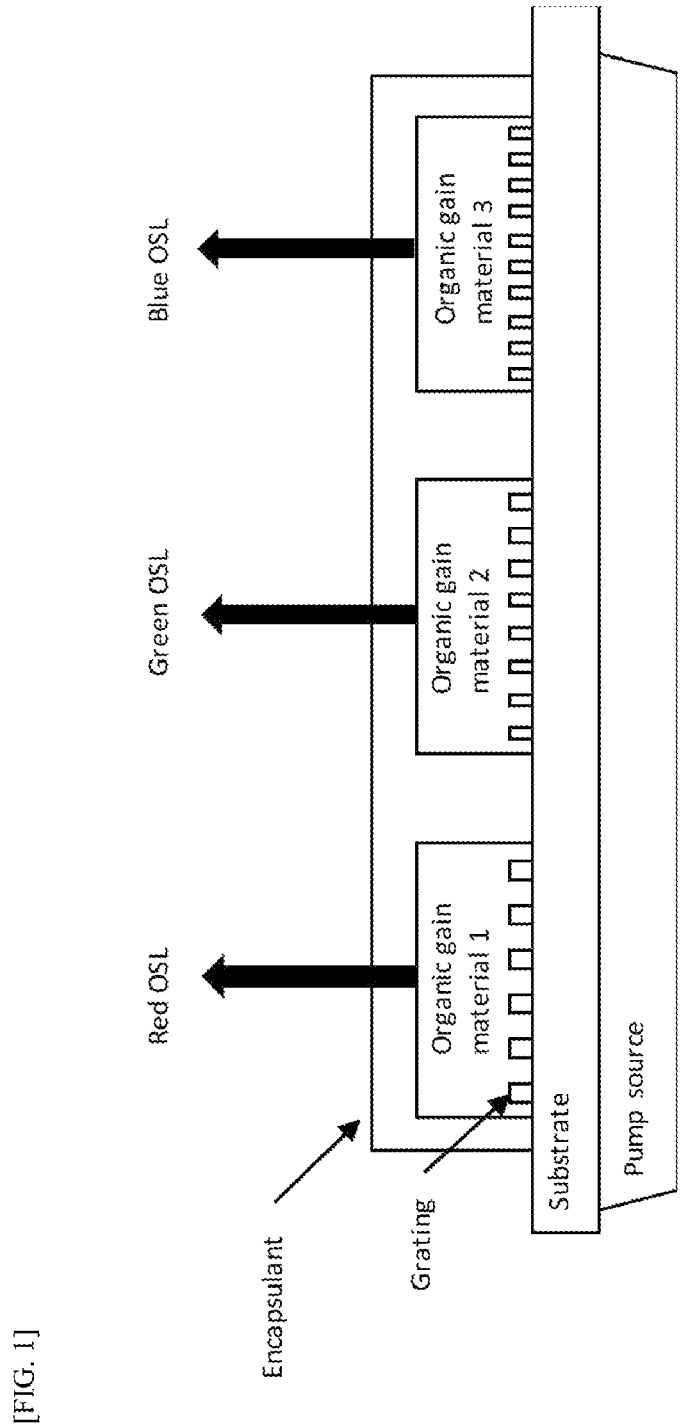
[FIG. 1]

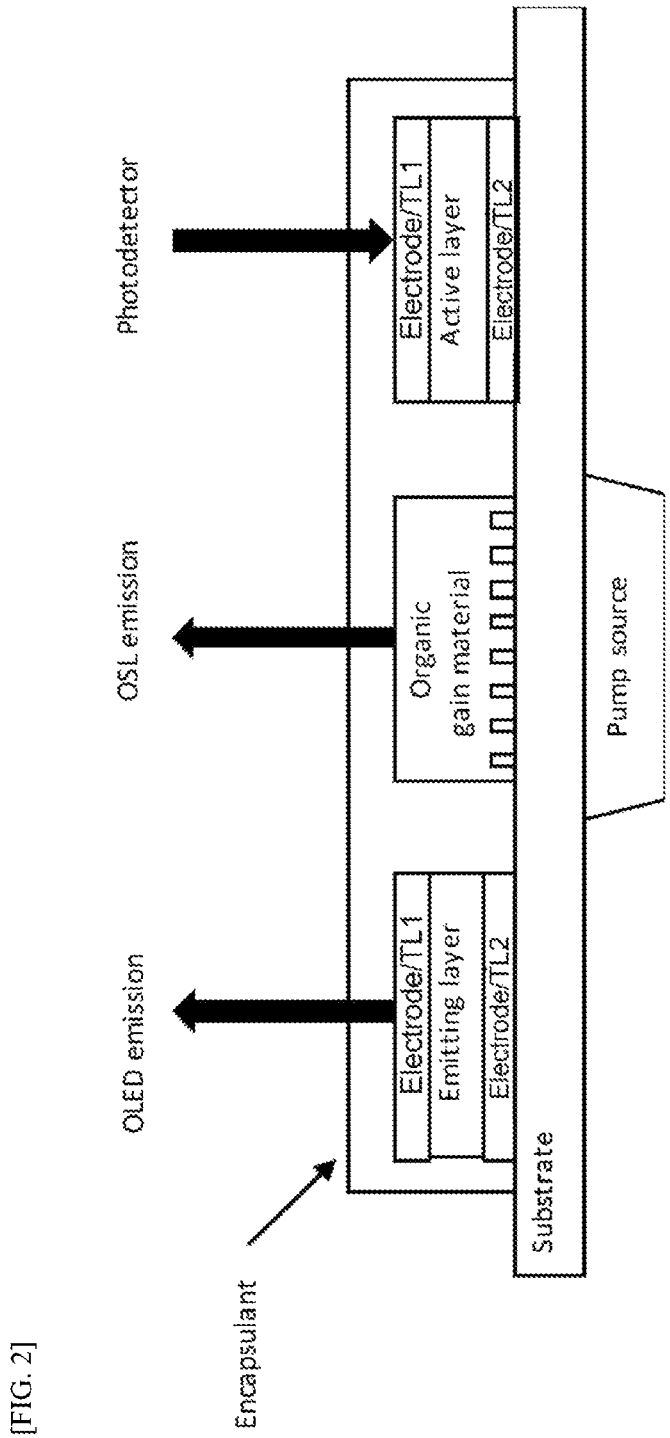
[FIG. 2]

[FIG. 3]
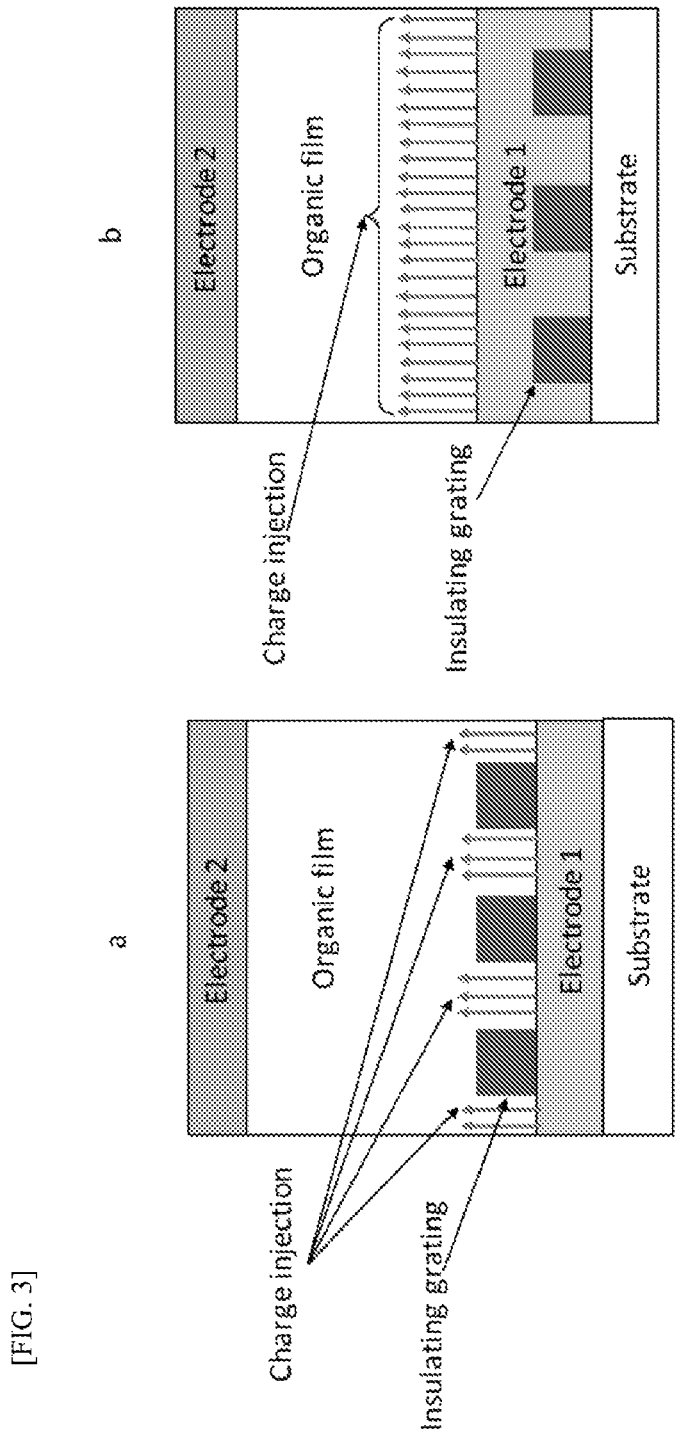

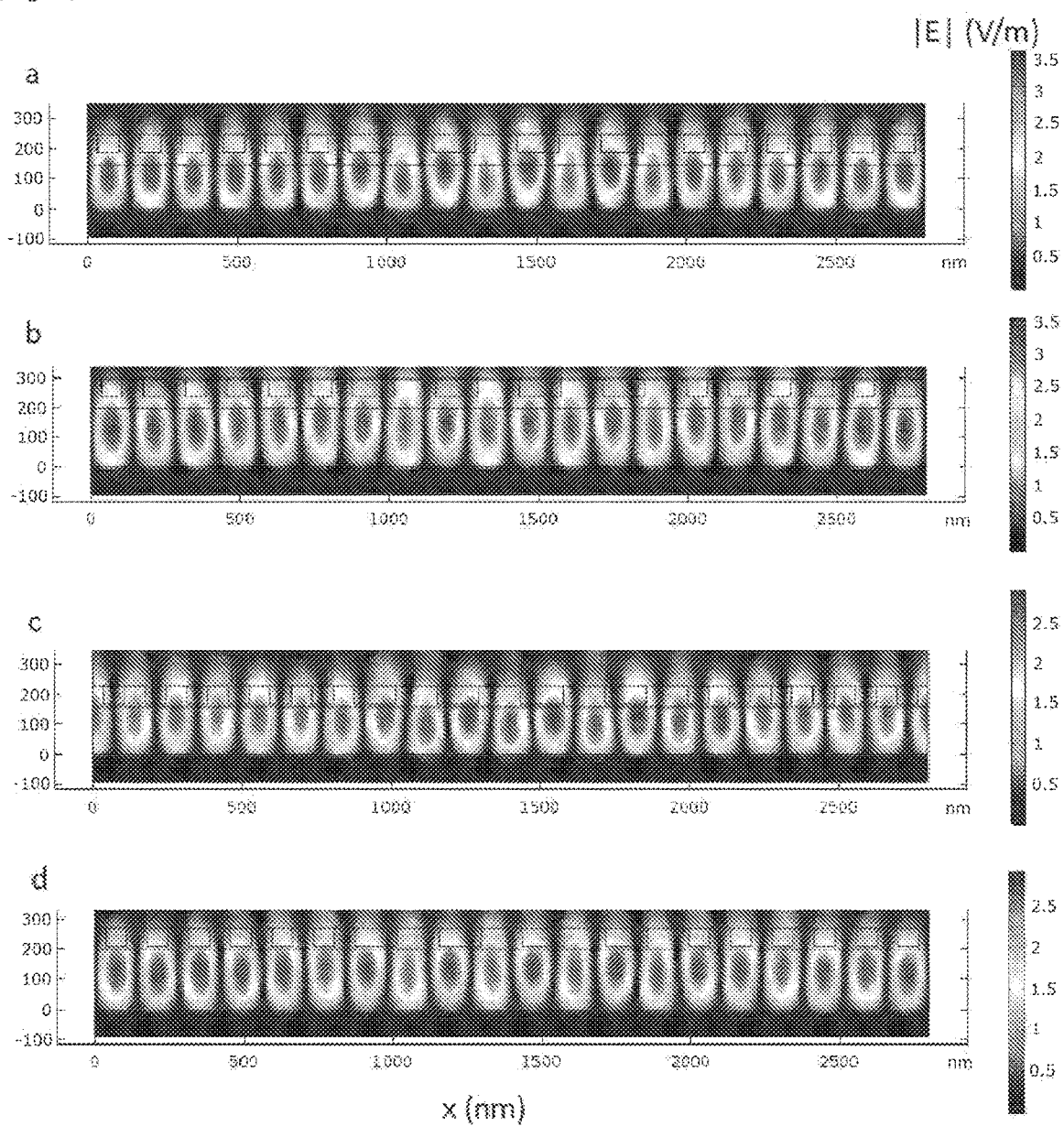
[Fig. 4]

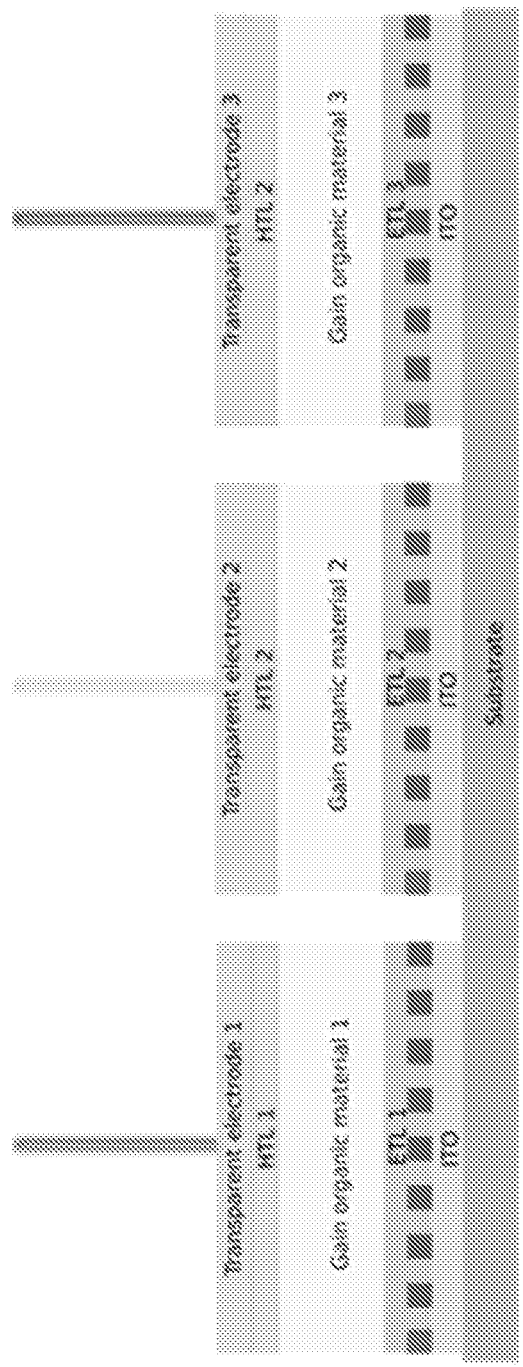
[FIG. 5]

[Fig. 6-1]
a
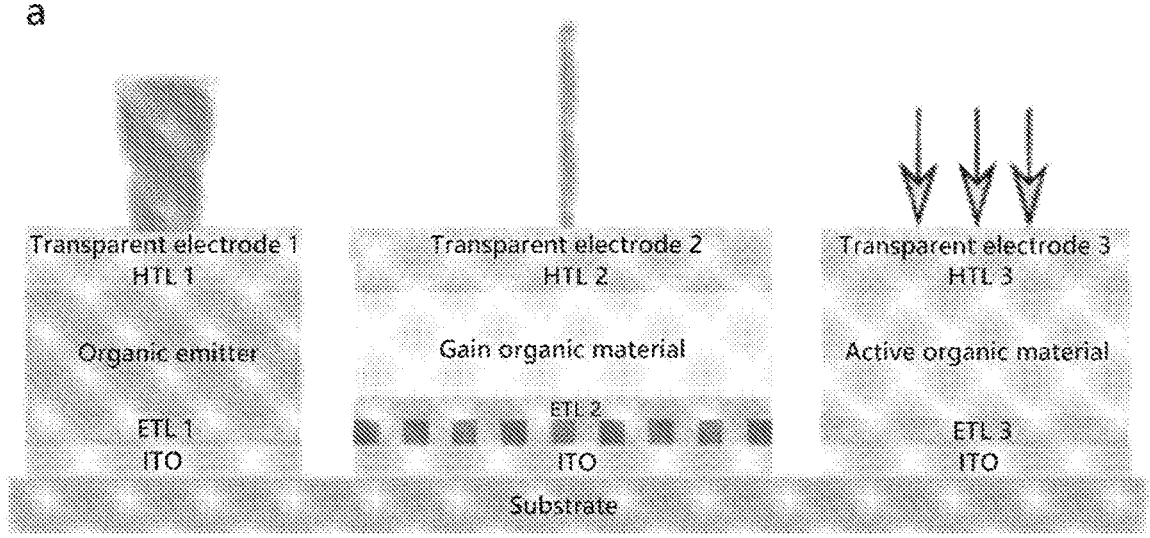
b
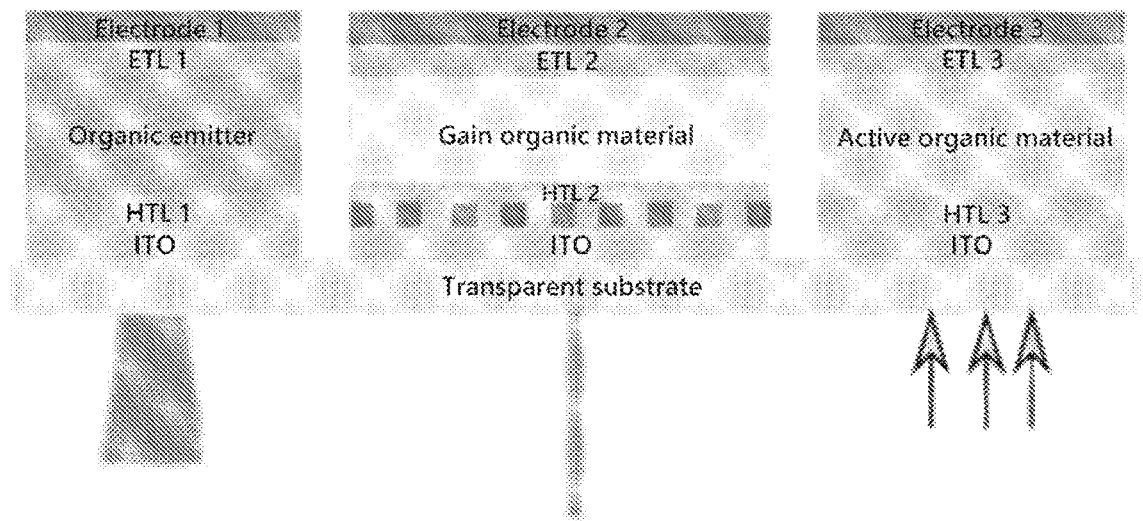

[Fig. 6-2]
c
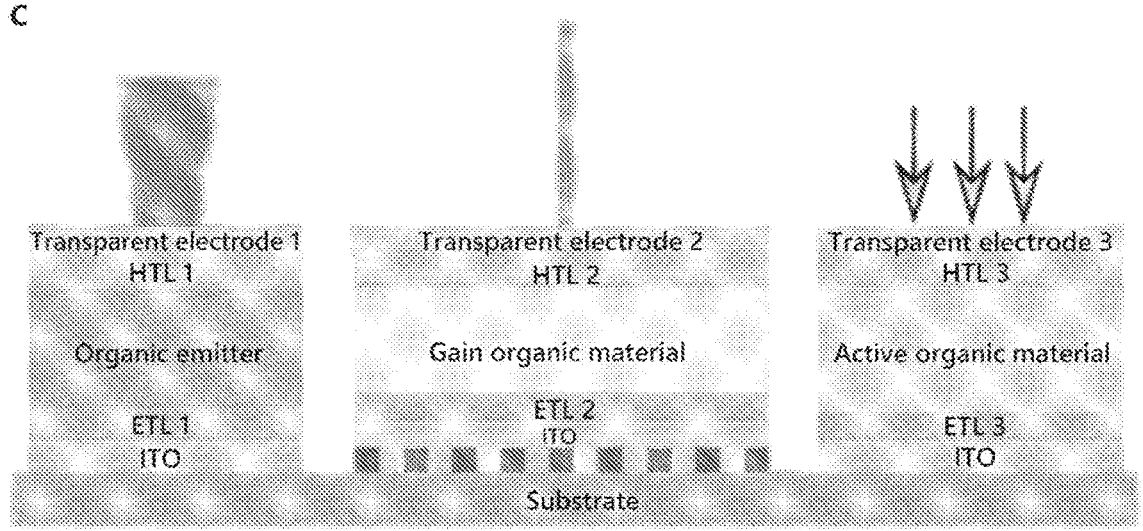
d
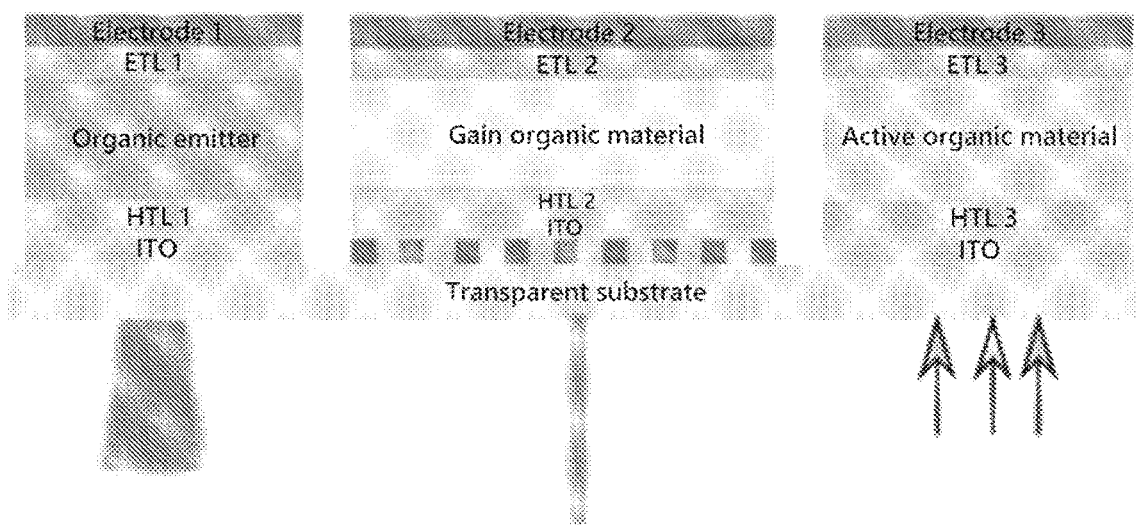

[Fig. 7]
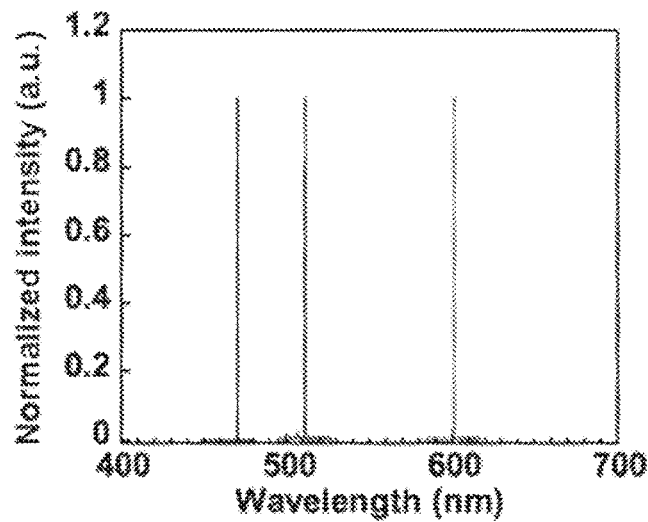
[Fig. 8]
a
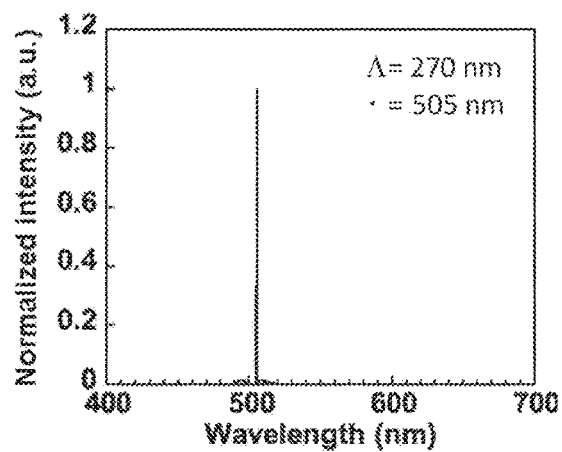
b
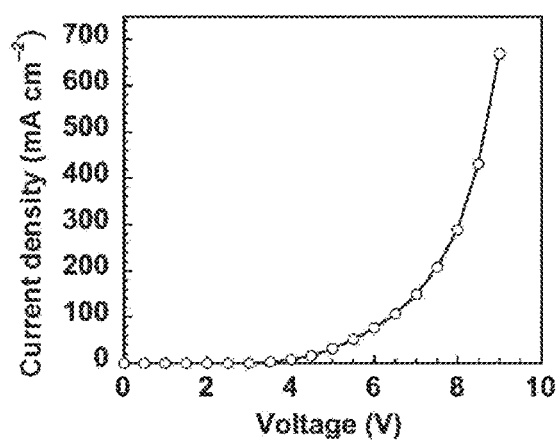
c
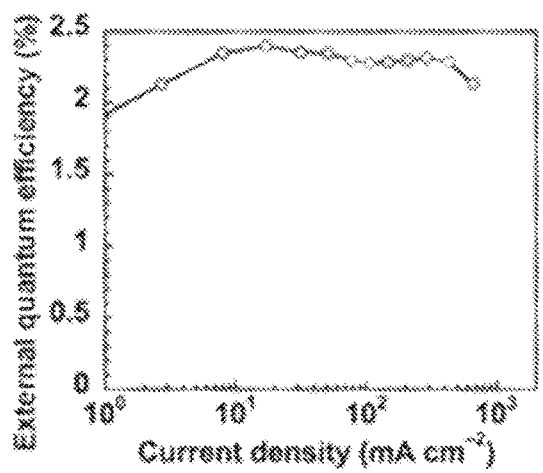
d
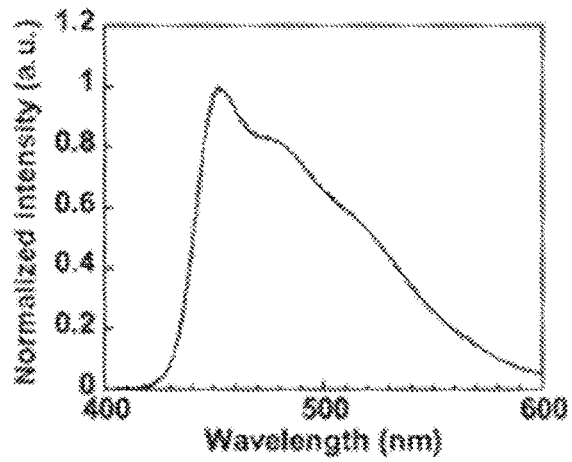

ELEMENT, METHOD FOR PRODUCING SAME AND ORGANIC SEMICONDUCTOR LASER DIODE

TECHNICAL FIELD

The present invention relates to an element having a substrate and at least two different optoelectronic devices, wherein the at least two different optoelectronic devices are monolithically fabricated on the substrate. The present invention also relates to a method for producing the element and an organic semiconductor laser diode having a substrate, an insulating grating, a first electrode, an organic layer and a second electrode in this order.

BACKGROUND ART

In conventional inorganic electronics, devices with different functions require different crystalline semiconducting materials and different manufacturing processes. For example, in order to assemble different devices (light emitting diode, laser diode, transistor, etc. . . . ) on the same substrate, different crystalline inorganic materials have to be grown on the same substrate. Growing different crystalline materials on the same substrate is challenging since they possess different lattice parameters. These issue limits the use of versatile substrate and the integration density in a chip and increases the manufacturing cost.

In addition, the technology of RGB laser didoes using conventional inorganic light emitting semiconductors suffers from a critical issue in miniaturization and mass production. In fact, the gain materials for the red, green and blue laser diodes are GaN, GaInN and AlGaInP, respectively. These crystalline semiconductors do not possess the same lattice parameters. Thus, it is very challenging to growth the three different laser diodes on the same substrate. These issue limits also the use of versatile substrates such as glass, plastics and papers. Moreover, the assembly of conventional RGB laser diodes to make compact systems is limited by the use of connectors and different driving conditions which limits drastically the integration density in a chip and in microdisplays requiring high resolution. For example, the integration of both AlGaInP-based and InGaN-based LDs onto one substrate is realized using adhesive bonding and a chemical wet etching process to monolithically integrate two materials with different bandgap energies for green and red light emission. In order to tend toward an ultimate miniaturization of chips, it is crucial to assemble optoelectronic devices monolithically using common fabrication process.

On the other hand, a current-injection semiconductor laser diode using organic material has been recently demonstrated. PTL 1 discloses a current-injection organic semiconductor laser diode having a pair of electrodes, an optical resonator structure, and one or more organic layers including a light amplification layer composed of an organic semiconductor, which has a sufficient overlap between the distribution of exciton density and the electric field intensity distribution of the resonant optical mode during current injection to emit laser light.

CITATION LIST

Patent Literature

PTL 1: WO2018/147470

SUMMARY OF INVENTION

In light of these circumstances, the present inventors have conducted assiduous studies with the aim of providing an element provided with at least two different optoelectronic devices that solves the above-mentioned problems caused by the use of inorganic semiconductor materials. As a result of assiduous studies, the present inventors have made the following inventions:

(1) An element comprising a substrate and at least two different optoelectronic devices, wherein the at least two different optoelectronic devices are monolithically fabricated on the substrate.
(2) The element according to (1), wherein the at least two different optoelectronic devices are at least two optically pumped organic solid-state lasers emitting at different wavelengths.
(3) The element according to (1), wherein the at least two different optoelectronic devices are at least two organic semiconductor laser diodes emitting at different wavelengths.
(4) The element according to (1), wherein the at least two different optoelectronic devices are an organic solid-state laser, and an organic light emitting diode.
(5) The element according to (1), wherein the at least two different optoelectronic devices comprise an organic solid-state laser diode comprising a substrate, an insulating grating, a first electrode, an organic layer and a second electrode in this order.
(6) The element according to any one of (1) to (5), wherein the at least two different optoelectronic devices comprise an organic solid-state laser diode and the element emits from the bottom thereof.
(7) The element according to any one of (1) to (5), wherein the at least two different optoelectronic devices comprise an organic solid-state laser diode and the element emits from the top thereof.
(8) An organic semiconductor laser diode comprising a substrate, an insulating grating, a first electrode, an organic layer and a second electrode in this order.
(9) A method for producing an element comprising a substrate and at least two different optoelectronic devices, which comprises fabricating the at least two different optoelectronic devices on the substrate monolithically.
(10) The method according to (9), wherein the element comprises a substrate and at least two different optoelectronic devices, wherein the at least two different optoelectronic devices comprise an organic solid-state laser diode and the method comprises forming an insulating grating on the substrate and then forming organic layers for the at least two different optoelectronic devices.

BRIEF DESCRIPTION OF DRAWINGS

FIG. 1 shows a monolithically integrated RGB organic solid-state laser under optical pumping according to the present invention.

FIG. 2 shows a monolithically integrated optically pumped organic solid-state laser, OLED and organic photodetector.

FIG. 3 shows a schematic of a) OSLD used in WO 2018/147470 A1 and b) new design OSLD of the invention.

FIG. 4 shows electric field distribution of the DFB resonant cavity at the resonant wavelength of a) OSLD1, b) OSLD2, c) OSLD3 and d) OSLD4.

FIG. 5 shows a schematic of monolithically integrated RGB organic semi-conductor laser diode.

FIG. 6-1 shows schematic of monolithically integrated organic semiconductor laser diode, organic light emitting diode and organic photodetector, a) top-emitting-detecting configuration and b) bottom-emitting-detecting configuration with grating on top of the ITO electrode.

FIG. 6-2 shows schematic of monolithically integrated organic semiconductor laser diode, organic light emitting diode and organic photodetector, c) top-emitting-detecting configuration and d) bottom-emitting-detecting configuration with grating beneath the ITO electrode.

FIG. 7 shows laser spectra of red, green and blue organic solid-state lasers monolithically integrated.

FIG. 8 shows a) laser spectra of blue organic solid state laser, b) current-voltage curve for the OLED, c) external quantum efficiency (EQE)-current curve for the OLED, d) electroluminescence spectra of the OLED.

DETAILED DESCRIPTION OF INVENTION

The contents of the invention will be described in detail below. The constitutional elements may be described below with reference to representative embodiments and specific examples of the invention, but the invention is not limited to the embodiments and the examples. In the description herein, a numerical range expressed as "to" means a range that includes the upper limit and/or the lower limit.

The element of the invention has a substrate and at least two different optoelectronic devices. The at least two different optoelectronic devices are monolithically fabricated on the substrate. Optoelectronic devices have the function to convert electricity to light or light to electricity. Examples of optoelectronic devices include optically pumped organic solid-state lasers (OSL), organic semiconductor laser diodes (OSLD), organic light emitting diodes (OLED), organic photodetectors and organic solar cells. At least two optoelectronic devices in the element of the invention differ from each other but they may belong to the same type of optoelectronic device. In some embodiments of the invention, the at least two optoelectronic devices are at least two optically pumped organic solid-state lasers emitting at different wavelengths. In some embodiments of the invention, the at least two optoelectronic devices are at least two organic semiconductor laser diodes emitting at different wavelengths. In some embodiments of the invention, the at least two optoelectronic devices are an organic solid-state laser, and an organic light emitting diode. As long as the element of the invention has at least two optoelectronic devices different from each other, the element may have at least one additional optoelectronic device which is the same as any of the at least two optoelectronic devices. The element of the invention may also have organic photodetectors, organic field effect transistors, organic thermo-generators, etc.

At least two different optoelectronic devices are monolithically fabricated on a substrate. In some embodiments of the invention, at least two different optoelectronic devices are monolithically fabricated on a single substrate. In some embodiments of the invention, the at least two different optoelectronic devices are encapsulated together. In some embodiments of the invention, the at least two different optoelectronic devices have at least one common organic layer of the same composition. The common organic layer in each device may be the same thickness. In some embodiments of the invention, the number of the common organic layers may be at least 2, at least 3 or at least 4. In some embodiments, the at least two different optoelectronic devices are less than 1 mm apart from each other. They may be less than 10 micrometers, less than 1 micrometers or less than 100 nanometers.

The invention includes the following four aspects.

(1) First Aspect of Invention

Background

The use of RGB lasers in displays is very attractive alternative to conventional technologies such as light emitting diodes (LED) and organic light emitting diodes (OLED). Laser sources offer high color purity thanks to the extremely narrow spectral line width (~0.2 nm), high brightness and high power efficiency that contribute to downsizing display systems.

The technology of RGB laser didoes using conventional inorganic light emitting semiconductors suffers from a critical issue in miniaturization and mass production. In fact, the gain materials for the red, green and blue laser diodes are GaN, GaInN and AlGaInP, respectively. These crystalline semiconductors do not possess the same lattice parameters. Thus, it is very challenging to growth the three different laser diodes on the same substrate. These issue limits also the use of versatile substrates such as glass, plastics and papers. Moreover, the assembly of conventional RGB laser diodes to make compact systems is limited by the use of connectors and different driving conditions which limits drastically the integration density in a chip and in micro-displays requiring high resolution. For example, the integration of both AlGaInP-based and InGaN-based LDs onto one substrate is realized using adhesive bonding and a chemical wet etching process to monolithically integrate two materials with different bandgap energies for green and red light emission. In order to tend toward an ultimate miniaturization of chips, it is crucial to assemble optoelectronic devices monolithically using common fabrication process.

(Invention)

The use of organic semiconductors can solve the issues inherent to inorganic semiconductors. In fact, the use of organic semiconductors allows the fabrication of dense monolithic circuits on a large variety of substrate such as glass, plastics and even papers. This interesting feature comes from the fact that organic semiconductors are amorphous and do not need to be crystalline. Moreover, organic semiconductors can be deposited using various simple techniques suitable for mass production such as inkjet printing and thermal evaporation.

The first aspect of the invention provides an element comprising a substrate and at least two optically pumped organic solid-state lasers (OLS) emitting at different wavelengths, wherein the at least two organic solid-state lasers are monolithically fabricated on the substrate.

More specifically, monolithic integration of optically pumped RGB OSLs on the same substrate and using the same fabrication process is proposed. Two, three or more colors (wavelengths) are possible to integrate together. Instead of or in addition to red, green and blue, other colors can be used.

The first aspect of the invention includes the followings:

[Embodiment 1-1] Organic solid-state laser emitting at different wavelengths (for example, red, green and blue) are fabricated on the same substrate (monolithic integration).

[Embodiment 1-2] Monolithic integration on flexible substrate and transparent.

[Embodiment 1-3] Fabrication method: solution process (Inkjet, spin coating) and thermal evaporation.

In some embodiments of the invention, the OSL structure is composed of:
1. Pump source
2. Substrate
3. Grating
4. Gain organic material (semiconductor)
5. Encapsulant The grating can be in the upper side of the organic gain material or in the upper side of the substrate, in the lower side of the organic gain material. In one embodiment of the invention, the substrate, the grating and the organic gain material are formed in this order from the bottom. In one embodiment of the invention, the substrate, the organic gain material and the grating are formed in this order from the bottom. In one embodiment of the invention, the grating is in contact with the organic gain material. In one embodiment of the invention, the grating is in contact with the substrate. In one embodiment, the organic material is in contact with the grating that is in contact with the substrate.

The advantage of this invention are:
increasing the integration density of devices toward an ultimate miniaturized chip through of the monolithic integration,
the use of transparent and flexible substrates,
simple fabrication processes suitable for mass production such as inkjet printing and thermal evaporation.
acceleration of the progress toward all-organic electronic platform.

FIG. 1 shows a monolithically integrated RGB organic solid-state laser under optical pumping according to the present invention.

Example: Monolithic Integration of Red, Green and Blue Organic Solid-State Lasers Red, green and blue surface-emitting organic solid-state lasers (FIG. 1) were fabricated on the same substrate glass and using thermal evaporation process for the three colors. The OSLs comprise an emitter deposited by thermal evaporation on $2^{nd}$ order distributed feedback grating (DFB) and then encapsulated using cytop and Sapphire lid. The DFB gratings were directly engraved using electron beam lithography and reactive ion etching onto silicon dioxide surfaces. FIG. 7 shows the laser spectra of red, green and blue organic solid-state lasers monolithically integrated. The periods for the blue, green and red organic solid-state lasers are $\Lambda=270$, 310, 380 nm, emitting laser emission at $\lambda=470$, 511, 601 nm, respectively.

(2) Second Aspect of Invention

Background

The miniaturization of electronic components enables smart wearable tiny devices such as smart watches, medical handheld monitors, head mounted displays, etc. to perform almost all the function of smartphones. In order to tend toward an ultimate miniaturization of chips, it is crucial to assemble optoelectronic devices monolithically using common fabrication process.

In conventional inorganic electronics, devices with different functions require different crystalline semiconducting materials and different manufacturing processes. For example, in order to assemble different devices (light emitting diode, laser diode, transistor, etc. . . . ) on the same substrate, different crystalline inorganic materials have to be grown on the same substrate. Growing different crystalline materials on the same substrate is challenging since they possess different lattice parameters. These issue limits the use of versatile substrate and the integration density in a chip and increases the manufacturing cost.

The use of innovative materials such as organic semiconductors can solve the issues inherent to inorganic materials. In fact, the use of organic semiconductors allows the fabrication of monolithic circuits on a large variety of substrate such as glass, plastics and even papers. This interesting feature comes from the fact that organic semiconductors are amorphous and do not need to be crystalline. Thus, they can be deposited using various simple techniques such as spin coating, inkjet printing and thermal evaporation. In addition, the monolithic integration of organic semiconductor devices is very important feature to accelerate the convergence toward all-organic electronic platform.

Nowadays, many electronic devices can be made with organic materials such as organic solar cells, organic sensors, organic field effect transistor (OFET), organic light emitting diode (OLED), organic memories and organic lasers. OLED and organic optical sensors have been commercialized and are surpassing inorganic device markets.

The integration of an OSL in all-organic electronic platform can add and improve the device function in applications such as sensing and displays.

(Invention)

The second aspect of the invention provides an element comprising a substrate, an optically pumped organic solid-state laser, and an organic light emitting diode, wherein the organic solid-state laser and the organic light emitting diode are monolithically fabricated on the substrate.

In some embodiments, an OSL, an OLED and an organic photodetector are fabricated on the same substrate aiming for the demonstration of monolithically integrated optically pumped OSL in all-organic electronic platform.

Monolithic integration of OSL in all-organic electronic platform is proposed. The all-organic optoelectronic system can be composed of an optically pumped OSL, an OLED, an organic solar cell, an optical photodetector, an organic field effect transistor, an organic memory and an organic thermoelectric generator.

FIG. 1 depicts an integration of optically pumped OSL, OLED and organic photodetector fabricated in same area. It is fabricated on the same substrate in this embodiment. The OLED is composed of an emitting organic layer sandwiched between two transport layers (TL) and two electrodes. The OLED can emit from the top or the bottom. The OSL is composed of a distributed feedback grating (DFB) and gain organic material. The DFB can be place on the substrate or on the top of the organic gain material. The photodetector is composed of an active organic layer sandwiched between two transport layers (TL) and two electrodes. The three devices are fabricated on a common substrate.

The second aspect of the invention includes the followings:

[Embodiment 2-1] An organic solid-state laser, organic light emitting diode and optical photodetector are monolithically integrated (fabrication on the same substrate).

[Embodiment 2-2] Monolithic integration on flexible substrate and transparent substrate.

[Embodiment 2-3] This invention covers the combination of:
 [Embodiment 2-4] OLED+OSL
 [Embodiment 2-5] OLED+OSL+organic solar cell
 [Embodiment 2-6] OLED+OSL+organic photodetector
 [Embodiment 2-7] OLED+OSL+organic field effect transistor

[Embodiment 2-8] OLED+OSL+organic thermo-generator

[Embodiment 2-9] OLED+OSL+organic solar cell+organic photodetector+organic field effect transistor+organic thermo-generator FIG. 2 shows a monolithically integrated OLED, OSL and organic photodetector.

Example: Monolithic Integration of Organic Laser and OLED

The devices were prepared by vacuum deposition. First, glass substrates coated with 100-nm-thick patterned ITO were cleaned by ultrasonication using neutral detergents, pure water, acetone, and isopropanol, successively, followed by UV-ozone treatment. The $SiO_2$ was deposited by sputtering using a masque to protect the OLEDs areas. The DFB grating was fabricated on $SiO_2$ layer using electron beam lithography and reactive ion etching on non ITO part. Organic layers, injection layers, and metal electrode layers were then vacuum-deposited using a masque. The metal masque protects the DFB grating area (no metal deposition on the DFB grating area). The devices were encapsulated in a nitrogen-filled glovebox using glass lids and UV-cured epoxy. FIGS. 8(a, b, c, d) show the laser spectra of blue organic solid-state laser, the current-voltage curve for the OLED, the external quantum efficiency (EQE)-current curve for the OLED, and electroluminescence spectra of the OLED, respectively.

(3) Third Aspect of Invention

Background

The use of red, green and blue (RGB) lasers in displays is very attractive alternative to conventional technologies such as light emitting diodes (LED) and organic light emitting diodes (OLED). Laser sources offer high color purity thanks to the extremely narrow spectral line width (~0.2 nm), high brightness and high power efficiency that contribute to downsizing display systems.

The technology of RGB laser didoes using conventional inorganic light emitting semiconductors suffers from a critical issue in miniaturization and mass production. In fact, the gain materials for the red, green and blue laser diodes are GaN, GaInN and AlGaInP, respectively. These crystalline semiconductors do not possess the same lattice parameters. Thus, it is very challenging to growth the three different laser diodes on the same substrate. These issue limits also the use of versatile substrate such as glass plastics and papers. Moreover, the assembly of conventional RGB laser diodes to make compact systems is limited by the use of connectors and different driving conditions which limits drastically the integration density in a chip and in microdisplays requiring high resolution. For example, the integration of both AlGaInP-based and InGaN-based LDs onto one substrate is realized using adhesive bonding and a chemical wet etching process to monolithically integrate two materials with different band gap energies for green and red light emission. In order to tend toward an ultimate miniaturization of chips, it is crucial to assemble optoelectronic devices monolithically using common fabrication process.
(Invention)

The use of organic semiconductors can solve the issues inherent to inorganic semiconductors. In fact, using organic semiconductors allows the fabrication of dense monolithic circuits on a large variety of substrate such as glass, plastics and even papers. This interesting feature comes from the fact that organic semiconductors are amorphous and do not need to be crystalline. Moreover, organic semiconductors can be deposited using various simple techniques suitable for mass production such as inkjet printing and thermal evaporation.

The third aspect of the invention provides an organic semiconductor laser diode comprising a substrate, an insulating grating, a first electrode, an organic layer and a second electrode in this order; and monolithic integration of two or more different organic semiconductor laser diodes.

The third aspect of the invention includes the followings:

[Embodiment 3-1] Organic semiconductor laser diodes emitting at different wavelengths (red, green and blue) are fabricated in same area. It is fabricated on the same substrate (monolithic integration) in this embodiment. The distributed feedback resonator is fabricated on top of the substrate, beneath the electrode. The monolithically integrated organic semiconductor laser diodes can emit from the top or from the bottom.

[Embodiment 3-2] The monolithically integrated organic semiconductor laser diodes can be flexible.

[Embodiment 3-3] The monolithically integrated organic semiconductor laser diodes can be transparent.

The third aspect of the invention provides the following two inventive concepts:

<1> New OSLD Design with Transparent Electrode in the Upper Side of the Grating

The first demonstration of OSLD [WO 2018/147470 A1] uses an insulation grating in the upper side (in this publication, on top) of the ITO electrode. The role of the grating is to produce optical feedback. The fabrication of the insulating grating on top of the electrode is complicated since a complete removal of the insulator on top of the electrode is required in order to allow the charge injection from the electrode to the emitting layer as shown in FIG. 3(a). In the new OSLD design proposed in this invention, the grating is in the lower side (in this embodiment, on the lower side) of the electrode as presented in FIG. 3(b). When the electrode is on top of the insulating grating, charge carriers are injected from the whole device area. Thus, excitons can be generated uniformly inside the device which increases the gain due to the increase of the overlap of the excitons density and the optical resonant mode.

Optical simulations have been performed to design the OSLD structure presented in FIGS. 4(a-d). The thicknesses of the ITO electrode and the organic film, $d_{ITO}$ and $d_{FILM}$ respectively, are optimized in order to adjust the resonant wavelength $\lambda_0$ and to increase the Q-factor and the confinement factor $\Gamma$. The results of the optical optimization are presented in Table 1. FIG. 4 show electric field distribution of the DFB resonant cavity at the resonant wavelength of a) OSLD1, b) OSLD2, c) OSLD3 and d) OSLD4. In OSLD1-4 the DFB grating is fabricated on top of the substrate and beneath the ITO electrode. In OSLD-ref, the DFB grating is fabricated on top of the ITO electrode (previously patented OSLD WO2018/147470A1). OSLD1-4 showed all a higher Q-factor and confinement factor than OSLD-ref. The resonant cavity od OSLD4 showed the best optical performances.

TABLE 1

Optical and geometrical parameters of the OSLD.

| Structure | $\lambda_0$ (nm) | Q-factor | $\Gamma$ (%) | $d_{ITO}$ (nm) | $d_{FILM}$ (nm) |
|---|---|---|---|---|---|
| OSLD1 | 480 | 643 | 63 | 100 | 150 |
| OSLD2 | 493 | 642 | 64 | 100 | 200 |

TABLE 1-continued

Optical and geometrical parameters of the OSLD.

| Structure | $\lambda_0$ (nm) | Q-factor | $\Gamma$ (%) | $d_{ITO}$ (nm) | $d_{FILM}$ (nm) |
|---|---|---|---|---|---|
| OSLD3 | 481 | 460 | 65 | 70 | 160 |
| OSLD4 | 485 | 726 | 79 | 70 | 200 |
| OSLD-ref | 483 | 255 | 40 | 100 | 210 |

<2> Monolithic Integration of Two or More Different Organic Semiconductor Laser Diodes As a preferable embodiment, monolithic integration of RGB colors is shown in FIG. 5. Two, three or more colors (wavelengths) are possible to integrate together. Instead of or in addition to red, green and blue, other colors can be used.

The OSLD structure can be:
1. top-emitting OSLD structure composed of a substrate, an electrode, a distributed feedback (DFB) grating made of a low refractive index material, an electron transport layer, an organic gain layer, a hole transport layer and a transparent or semi-transparent electrode in this order.
2. bottom-emitting OSLD structure composed of a substrate, an electrode, a DFB grating made of a low refractive index material, a hole transport layer, an organic gain layer, an electron transport layer and a transparent or semi-transparent electrode in this order.

In both cases, the DFB grating can be fabricated in same area (in this embodiment, on top) of the substrate and in one side of (in this embodiment, beneath) the ITO electrode. For example, the following OSLD structures are included in the invention:
1. top-emitting OSLD structure composed of a substrate, a distributed feedback (DFB) grating made of a low refractive index material, a transparent or semi-transparent electrode, an electron transport layer, an organic gain layer, a hole transport layer and a transparent or semi-transparent electrode in this order.
2. bottom-emitting OSLD structure composed of a substrate, a DFB grating made of a low refractive index material, a transparent or semi-transparent electrode, a hole transport layer, an organic gain layer, an electron transport layer and a transparent or semi-transparent electrode in this order.

The advantages of the third aspect of the invention are:
increasing the integration density of devices toward an ultimate miniaturized chip through of the monolithic integration,
the use of flexible substrate,
simple fabrication processes suitable for mass production such as inkjet printing and thermal evaporation, and
acceleration of the progress toward all-organic electronic platform.

(4) Fourth Aspect of Invention

Background

The miniaturization of electronic components enables smart wearable tiny devices such as smart watches, medical handheld monitors, etc. to perform almost all the function of smartphones. In order to tend toward an ultimate miniaturization of chips, it is crucial to assemble optoelectronic devices monolithically using common fabrication process.

Compared to conventional electronics, organic electronics has a low manufacturing cost, fast and easy manufacturing processes suitable for mass production, offers the possibility to produce ultraflexible, foldable, stretchable and biocompatible devices. Through molecular design, versatile molecules with different properties and different emission wavelengths can be easily realized. In inorganic electronics, different color light emitting (LEDs) diodes and laser diodes (LDs) require different crystalline semiconducting materials and different manufacturing process chambers. Thus, the monolithic integration of inorganic LEDs and LDs cannot be made on a common substrate.

In contrary, the versatile properties of organic materials make possible the fabrication of several devices with different optoelectronic functions such as organic lasers, OLEDs, organic solar cells and optical sensors. In fact, the architecture of organic electronic devices consists of organic active layer stacked between interfacial layers and electrodes. This device architecture is the common denominator between organic electronic devices. Thus, the use of organic semiconductors allows the fabrication of monolithic circuits on a large variety of substrate such as glass, plastics and even papers. This interesting feature comes from the fact that organic semiconductors are amorphous and do not need to be crystalline. Thus, they can be deposited using various simple technics such as spin coating, inkjet printing and thermal evaporation. The monolithic integration of organic semiconductor devices is very important feature to accelerate the convergence toward all-organic electronic platform.

Nowadays, many electronic devices can be made with organic materials such as organic solar cells, organic sensors, organic field effect transistor (OFET), organic light emitting diode (OLED), organic memories and organic lasers. OLED and organic optical sensors have been commercialized and are surpassing inorganic device markets.

(Invention)

Recently, organic semiconductor laser diode (OSLD) has been demonstrated. Interestingly, the OSLD has a similar structure as OLED. The main difference is that in an OSLD, a resonant cavity is needed in order to provide optical feedback. Thus, the fabrication method of OSLD is compatible with OLED technology.

The fourth aspect of the invention provides an element comprising a substrate and at least two organic semiconductor laser diodes emitting at different wavelengths, wherein the at least two organic semiconductor laser diodes are monolithically fabricated on the substrate. The fourth aspect of the invention also provides an element comprising a substrate, an organic semiconductor laser diode, and an organic light emitting diode, wherein the organic semiconductor laser diode and the organic light emitting diode are monolithically fabricated on the substrate.

In some embodiments, an OSLD, an OLED and an organic photodetector are fabricated on the same substrate aiming for the demonstration of monolithically integrated OSLD, OLED and optical photodetector.

The fourth aspect of the invention includes the followings:

[Embodiment 4-1] An organic semiconductor laser diode, organic light emitting diode and optical photodetector are monolithically integrated (fabrication on the same substrate). Bottom-emission-detection and top-emission-detection system is proposed. The distributed feedback resonator can be fabricated in the upper side (for example, on top) of the substrate, and in the lower side (for example, on the lower side) of the electrode.

[Embodiment 4-2] Monolithic Integration on Flexible and/or Transparent Substrate An organic optoelectronic system composed of an OSLD, an OLED and an optical photodetector in the same area in substrate and using the same technology is presented in FIGS. 6(a-d). These Figures depict top-emitting-detecting and bottom-emitting-detecting configurations with grating in one side (in this embodiment, on the surface) of the ITO electrode. FIGS. 6(c, d) depict top-emitting-detecting and bottom-emitting-detecting configurations with grating in the lower side (in this embodiment, on the lower side) of the ITO electrode. By making the grating in the lower side (in this embodiment, on the lower side) of the ITO electrode, the injection is enhanced.

1. Top-emitting-detecting configuration includes (FIG. 6(a)):
   a. Top-emitting OLED structure composed of a substrate, an electrode, an electron transport layer, an organic emitting layer, a hole transport layer and a transparent or semi-transparent electrode in this order.
   b. Top-emitting OSLD structure composed of a substrate, an electrode, a distributed feedback (DFB) grating made of a low refractive index material, an electron transport layer, an organic gain layer, a hole transport layer and a transparent or semi-transparent electrode in this order.
   c. Top-detecting organic photodetector composed of a substrate, an electrode, an electron transport layer, an active organic (absorbing) layer, a hole transport layer and a transparent or semi-transparent electrode in this order.
2. Bottom-emitting-detecting configuration includes (FIG. 6(b)):
   a. Bottom-emitting OLED structure composed of a transparent or semi-transparent substrate, a transparent or semi-transparent electrode, a hole transport layer, an organic emitting layer, an electron transport layer and an electrode in this order.
   b. Bottom-emitting OSLD structure composed of a transparent or semi-transparent substrate, a transparent or semi-transparent electrode, a DFB grating made of a low refractive index material, a hole transport layer, an organic gain layer, an electron transport layer and an electrode in this order.
   c. Bottom-detecting organic photodetector composed of a transparent or semi-transparent substrate, a transparent or semi-transparent electrode, a hole transport layer, an active organic (absorbing) layer, an electron transport layer and an electrode in this order.
3. Top-emitting-detecting configuration includes (FIG. 6(c)):
   a. Top-emitting OLED structure composed of a substrate, an electrode, an electron transport layer, an organic emitting layer, a hole transport layer and a transparent or semi-transparent electrode in this order.
   b. Top-emitting OSLD structure composed of a substrate, a DFB grating made of a low refractive index material, an electrode, an electron transport layer, an organic gain layer, a hole transport layer and a transparent or semi-transparent electrode in this order.
   c. Top-detecting organic photodetector composed of a substrate, an electrode, an electron transport layer, an active organic (absorbing) layer, a hole transport layer and a transparent or semi-transparent electrode in this order.
4. Bottom-emitting-detecting configuration includes (FIG. 6(d)):
   a. Bottom-emitting OLED structure composed of a transparent or semi-transparent substrate, a transparent or semi-transparent electrode, a hole transport layer, an organic emitting layer, an electron transport layer and an electrode in this order.
   b. Bottom-emitting OSLD structure composed of a transparent or semi-transparent substrate, a DFB grating made of a low refractive index material, a transparent or semi-transparent electrode, a hole transport layer, an organic gain layer, an electron transport layer and an electrode in this order.
   c. Bottom-detecting organic photodetector composed of a transparent or semi-transparent substrate, a transparent or semi-transparent electrode, a hole transport layer, an active organic (absorbing) layer, an electron transport layer and an electrode in this order.

This invention covers the combination of:
OLED+OSLD
OLED+OSLD+organic solar cell
OLED+OSLD+organic photodetector
OLED+OSLD+organic field effect transistor
OLED+OSLD+Organic thermo-generator
OLED+OSLD+organic solar cell+organic photodetector+organic field effect transistor+Organic thermo-generator Embodiments of Invention The invention includes the following embodiments:
[1] An element comprising a substrate and at least two optically pumped organic solid-state lasers emitting at different wavelengths, wherein the at least two organic solid-state lasers are monolithically fabricated on the substrate.
[2] The element according to [1], comprising at least three organic solid-state lasers emitting at different wavelengths.
[3] The element according to [2], comprising an organic solid-state laser emitting blue light, an organic solid-state laser emitting green light, and an organic solid-state laser emitting red light.
[4] The element according to any one of [1] to [3], wherein the substrate is flexible.
[5] The element according to any one of [1] to [4], wherein the substrate is transparent.
(Note) The term "transparent" in this application includes both transparent and semi-transparent. The transmittance of "transparent" substrate or "transparent" electrode in this application is preferably at least 70%, more preferably at least 90%, further preferably at least 95%, still more preferably at least 99%.
[6] A method for producing an element comprising a substrate and at least two optically pumped organic solid-state lasers emitting at different wavelengths, which comprises fabricating the organic solid-state lasers on the substrate monolithically.
[7] The method for producing an element according to [6], wherein the element comprises at least three organic solid-state lasers emitting at different wavelengths.
[8] The method for producing an element according to [7], wherein the element comprises an organic solid-state laser emitting blue light, an organic solid-state laser emitting green light and an organic solid-state laser emitting red light.
[9] The method for producing an element according to any one of [6] to [8], wherein the substrate is flexible.
[10] The method for producing an element according to any one of [6] to [9], wherein the substrate is transparent.

[11] The method for producing an element according to any one of [6] to [10], which comprises fabricating the organic solid-state lasers on the substrate monolithically by a solution process.

[12] The method for producing an element according to any one of [6] to [10], which comprises fabricating the organic solid-state lasers on the substrate monolithically by an inkjet process.

[13] The method for producing an element according to any one of [6] to [10], which comprises fabricating the organic solid-state lasers on the substrate monolithically by a spin coating process.

[14] The method for producing an element according to any one of [6] to [10], which comprises fabricating the organic solid-state lasers on the substrate monolithically by a thermal evaporation process.

[15] An element comprising a substrate, an optically pumped organic solid-state laser, and an organic light emitting diode, wherein the organic solid-state laser and the organic light emitting diode are monolithically fabricated on the substrate.

[16] The element according to [15], comprising the substrate, the organic solid-state laser, the organic light emitting diode and an optical photodetector, wherein the organic solid-state laser, the organic light emitting diode and the optical photodetector are monolithically fabricated on the substrate.

[17] The element according to [15], comprising the substrate, the organic solid-state laser, the organic light emitting diode and an organic solar cell, wherein the organic solid-state laser, the organic light emitting diode and the organic solar cell are monolithically fabricated on the substrate.

[18] The element according to [15], comprising the substrate, the organic solid-state laser, the organic light emitting diode and an organic field effect transistor, wherein the organic solid-state laser, the organic light emitting diode and the organic field effect transistor are monolithically fabricated on the substrate.

[19] The element according to [15], comprising the substrate, the organic solid-state laser, the organic light emitting diode and an organic thermo-generator, wherein the organic solid-state laser, the organic light emitting diode and the organic thermo-generator are monolithically fabricated on the substrate.

[20] The element according to any one of [15] to [19], wherein the substrate is flexible.

[21] The element according to any one of [15] to [19], wherein the substrate is transparent.

[22] A method for producing an element comprising a substrate, an optically pumped organic solid-state laser, and an organic light emitting diode, which comprises fabricating the organic solid-state laser and the organic light emitting diode on the substrate monolithically.

[23] The method for producing an element according to [22], which comprises fabricating the organic solid-state laser, the organic light emitting diode, and an organic photodetector on the substrate monolithically.

[24] The method for producing an element according to [22] or [23], which comprises fabricating the organic solid-state laser, the organic light emitting diode, and an organic solar cell on the substrate monolithically.

[25] The method for producing an element according to any one of [22] to [24], which comprises fabricating the organic solid-state laser, the organic light emitting diode, and an organic field effect transistor on the substrate monolithically.

[26] The method for producing an element according to any one of [22] to [25], which comprises fabricating the organic solid-state laser, the organic light emitting diode, and an organic thermo-generator on the substrate monolithically.

[27] The method for producing an element according to any one of [22] to [26], which the fabrication is conducted monolithically by a solution process.

[28] The method for producing an element according to any one of [22] to [26], which the fabrication is conducted monolithically by an inkjet process.

[29] The method for producing an element according to any one of [22] to [26], which the fabrication is conducted monolithically by a spin coating process.

[30] The method for producing an element according to any one of [22] to [26], which the fabrication is conducted monolithically by a thermal evaporation process.

[31] An organic semiconductor laser diode comprising a substrate, an insulating grating, a first electrode, an organic layer and a second electrode in this order.

[32] The organic semiconductor laser diodes according to [31], wherein the insulating grating are in contact with the first electrode.

[33] The organic semiconductor laser diodes according to [31] or [32], wherein the insulating grating are in contact with the substrate.

[34] The organic semiconductor laser diodes according to any one of [31] to [33], wherein the first electrode and the substrate are transparent.

[35] The organic semiconductor laser diodes according to [34], which emits from the bottom (from the first electrode side).

[36] The organic semiconductor laser diodes according to any one of [31] to [35], wherein the second electrode is transparent.

[37] The organic semiconductor laser diodes according to [36], which emits from the top (from the second electrode side).

[38] The organic semiconductor laser diodes according to any one of [31] to [37], wherein no grating is formed on a surface of the first electrode on the organic layer side.

[39] The organic semiconductor laser diodes according to any one of [31] to [38], wherein charge carriers are injected into the organic layer from the surface of the first electrode without interference from a grating.

[40] The organic semiconductor laser diodes according to any one of [31] to [39], wherein the thickness of the first electrode and the thickness of the organic layer are optimized by adjusting resonant wavelength and increasing Q-factor and confinement factor.

[41] The organic semiconductor laser diodes according to any one of [31] to [39], having a Q factor of at least 450.

[42] The organic semiconductor laser diodes according to any one of [31] to [39], having a confinement factor of at least 60%.

[43] A method for producing an organic semiconductor laser diode, which comprises:

forming an insulating grating on or above a substrate, forming a first electrode on or above the insulating grating, forming an organic layer on or above the first electrode, and forming a second electrode on or above the organic layer.

[44] The method for producing an organic semiconductor laser diode according to [43], wherein the first electrode is formed directly on the insulating grating to completely cover the insulating grating with the first electrode.

[45] The method for producing an organic semiconductor laser diode according to [43] or [44], wherein the insulating grating is formed directly on the substrate.

[46] The method for producing an organic semiconductor laser diode according to any one of [43] to [45], wherein the first electrode and the substrate are transparent.

[47] The method for producing an organic semiconductor laser diode according to any one of [43] to [46], wherein the second electrode is transparent.

[48] The method for producing an organic semiconductor laser diode according to any one of [43] to [47], wherein no grating is formed on a surface of the first electrode on the organic layer side.

[49] The method for producing an organic semiconductor laser diode according to any one of [43] to [48], wherein the thickness of the first electrode and the thickness of the organic layer are optimized by adjusting resonant wavelength and increasing Q-factor and confinement factor.

[50] An organic semiconductor laser diode produced by the method of any one of [43] to [49].

[51] An element comprising a substrate and at least two organic semiconductor laser diodes emitting at different wavelengths, wherein the at least two organic semiconductor laser diodes are monolithically fabricated on the substrate.

[52] The element according to [51], comprising at least three organic semiconductor laser diodes emitting at different wavelengths.

[53] The element according to [52], comprising an organic semiconductor laser diode emitting blue light, an organic semiconductor laser diode emitting green light, and an organic semiconductor laser diode emitting red light.

[54] The element according to any one of [51] to [53], wherein the substrate is flexible.

[55] The element according to any one of [51] to [54], wherein the substrate is transparent.

[56] The element according to [55] wherein the at least two organic semiconductor laser diodes emit from the bottom.

[57] The element according to [56] wherein the at least two organic semiconductor laser diodes comprise a transparent substrate, a transparent first electrode, a distributed feedback (DFB) grating, a hole transport layer, an organic gain layer, an electron transport layer and a second electrode in this order.

[58] The element according to [56] wherein the at least two organic semiconductor laser diodes comprise a transparent substrate, a distributed feedback (DFB) grating, a transparent first electrode, a hole transport layer, an organic gain layer, an electron transport layer and a second electrode in this order.

[59] The element according to any one of [51] to [55] wherein the at least two organic semiconductor laser diodes emit from the top.

[60] The element according to [59] wherein the at least two organic semiconductor laser diodes comprise a substrate, a first electrode, a distributed feedback (DFB) grating, an electron transport layer, an organic gain layer, a hole transport layer and a transparent second electrode in this order.

[61] The element according to [59] wherein the at least two organic semiconductor laser diodes comprise a substrate, a distributed feedback (DFB) grating, a first electrode, an electron transport layer, an organic gain layer, a hole transport layer and a transparent second electrode in this order.

[62] The element according to any one of [51] to [61], wherein one or more of the at least two organic semiconductor laser diodes are the organic semiconductor laser diode of any one of [31] to [42] and [50].

[63] The element according to any one of [51] to [61], wherein all of the at least two organic semiconductor laser diodes are the organic semiconductor laser diode of any one of [31] to [42] and [50].

[64] A method for producing an element comprising a substrate and at least two organic semiconductor laser diodes emitting at different wavelengths, which comprises fabricating the organic semiconductor laser diodes on the substrate monolithically.

[65] The method for producing an element according to [64], wherein the element comprises at least three organic semiconductor laser diodes emitting at different wavelengths.

[66] The method for producing an element according to [65], wherein the element comprises an organic semiconductor laser diode emitting blue light, an organic semiconductor laser diode emitting green light and an organic semiconductor laser diode emitting red light.

[67] The method for producing an element according to any one of [64] to [66], wherein the substrate is flexible.

[68] The method for producing an element according to any one of [64] to [67], wherein the substrate is transparent.

[69] The method for producing an element according to any one of [64] to [68], wherein the at least two organic semiconductor laser diodes are fabricated by:

forming an insulating grating on or above a substrate, forming a first electrode on or above the insulating grating, forming an organic layer on or above the first electrode, and forming a second electrode on or above the organic layer.

[70] The method for producing an element according to [69], wherein the at least two organic semiconductor laser diodes are fabricated by the method of any one of [44] to [49].

[71] The method for producing an element according to any one of [64] to [68], wherein the at least two organic semiconductor laser diodes are fabricated by:

forming a first electrode on or above a substrate, forming an insulating grating on or above the first electrode, forming an organic layer on or above the insulating grating, and forming a second electrode on or above the organic layer.

[72] The method for producing an element according to any one of [64] to [71], which comprises fabricating the organic semiconductor laser diodes on the substrate monolithically by a solution process.

[73] The method for producing an element according to any one of [64] to [71], which comprises fabricating the organic semiconductor laser diodes on the substrate monolithically by an inkjet process.

[74] The method for producing an element according to any one of [64] to [71], which comprises fabricating the organic semiconductor laser diodes on the substrate monolithically by a spin coating process.

[75] The method for producing an element according to any one of [64] to [71], which comprises fabricating the organic semiconductor laser diodes on the substrate monolithically by a thermal evaporation process.

[76] An element comprising a substrate, an organic semiconductor laser diode, and an organic light emitting diode, wherein the organic semiconductor laser diode and the organic light emitting diode are monolithically fabricated on the substrate.

[77] The element according to [76], comprising the substrate, the organic semiconductor laser diode, the organic light emitting diode and an optical photodetector, wherein the organic semiconductor laser diode, the organic light emitting diode and the optical photodetector are monolithically fabricated on the substrate.

[78] The element according to [76], comprising the substrate, the organic semiconductor laser diode, the organic light emitting diode and an organic solar cell, wherein the organic semiconductor laser diode, the organic light emitting diode and the organic solar cell are monolithically fabricated on the substrate.

[79] The element according to [76], comprising the substrate, the organic semiconductor laser diode, the organic light emitting diode and an organic field effect transistor, wherein the organic semiconductor laser diode, the organic light emitting diode and the organic field effect transistor are monolithically fabricated on the substrate.

[80] The element according to [76], comprising the substrate, the organic semiconductor laser diode, the organic light emitting diode and an organic thermo-generator, wherein the organic semiconductor laser diode, the organic light emitting diode and the organic thermo-generator are monolithically fabricated on the substrate.

[81] The element according to any one of [76] to [80], wherein the substrate is flexible.

[82] The element according to any one of [76] to [80], wherein the substrate is transparent.

[83] The element according to [82], wherein the organic semiconductor laser diode and the organic light emitting diode emit from the bottom.

[84] The element according to [83] wherein the organic semiconductor laser diode comprises a transparent substrate, a transparent first electrode, a distributed feedback (DFB) grating, a hole transport layer, an organic gain layer, an electron transport layer and a second electrode in this order.

[85] The element according to [83], wherein the organic semiconductor laser diode comprises a transparent substrate, a distributed feedback (DFB) grating, a transparent first electrode, a hole transport layer, an organic gain layer, an electron transport layer and a second electrode in this order.

[86] The element according to any one of [77] to [82] wherein the organic semiconductor laser diode emits from the top.

[87] The element according to [86] wherein the organic semiconductor laser diode comprises a substrate, a first electrode, a distributed feedback (DFB) grating, an electron transport layer, an organic gain layer, a hole transport layer and a transparent second electrode in this order.

[88] The element according to [86] wherein the organic semiconductor laser diode comprises a substrate, a distributed feedback (DFB) grating, a first electrode, an electron transport layer, an organic gain layer, a hole transport layer and a transparent second electrode in this order.

[89] The element according to any one of [77] to [88], wherein the organic semiconductor laser diode is the organic semiconductor laser diode of any one of [31] to [42] and [50].

[90] A method for producing an element comprising a substrate, an organic semiconductor laser diode, and an organic light emitting diode, which comprises fabricating the organic semiconductor laser diode and the organic light emitting diode on the substrate monolithically.

[91] The method for producing an element according to [90], which comprises fabricating the organic semiconductor laser diode, the organic light emitting diode, and an organic photodetector on the substrate monolithically.

[92] The method for producing an element according to [90] or [91], which comprises fabricating the organic semiconductor laser diode, the organic light emitting diode, and an organic solar cell on the substrate monolithically.

[93] The method for producing an element according to any one of [90] to [92], which comprises fabricating the organic semiconductor laser diode, the organic light emitting diode, and an organic field effect transistor on the substrate monolithically.

[94] The method for producing an element according to any one of [90] to [93], which comprises fabricating the organic semiconductor laser diode, the organic light emitting diode, and an organic thermo-generator on the substrate monolithically.

[95] The method for producing an element according to any one of [90] to [94], wherein the substrate is flexible.

[96] The method for producing an element according to any one of [90] to [95], wherein the substrate is transparent.

[97] The method for producing an element according to any one of [90] to [96], wherein the organic semiconductor laser diode is fabricated by:
forming an insulating grating on or above a substrate,
forming a first electrode on or above the insulating grating,
forming an organic layer on or above the first electrode, and
forming a second electrode on or above the organic layer.

[98] The method for producing an element according to [97], wherein the organic semiconductor laser diode is fabricated by the method of any one of [44] to [49].

[99] The method for producing an element according to any one of [90] to [96], wherein the organic semiconductor laser diode is fabricated by:
forming a first electrode on or above a substrate,
forming an insulating grating on or above the first electrode,
forming an organic layer on or above the insulating grating, and
forming a second electrode on or above the organic layer.

[100] The method for producing an element according to any one of [90] to [99], which the fabrication is conducted monolithically by a solution process.

[101] The method for producing an element according to any one of [90] to [99], which the fabrication is conducted monolithically by an inkjet process.

[102] The method for producing an element according to any one of [90] to [99], which the fabrication is conducted monolithically by a spin coating process.

[103] The method for producing an element according to any one of [90] to [99], which the fabrication is conducted monolithically by a thermal evaporation process.

The invention claimed is:

1. An element comprising a substrate and at least two different optoelectronic devices, wherein the at least two different optoelectronic devices are monolithically fabricated on the substrate, and the element satisfies at least one of the following conditions (1) and (2):
   (1) the at least two different optoelectronic devices have different gratings from each other;
   (2) the at least two different optoelectronic devices comprise an organic solid-state laser diode comprising a substrate, an insulating grating, a first electrode, an organic layer and a second electrode in this order, wherein the insulating grating is in contact with the first electrode.

2. The element according to claim 1, satisfying the condition (1), wherein the at least two different optoelectronic devices are at least two optically pumped organic solid-state lasers emitting at different wavelengths.

3. The element according to claim 1, wherein the at least two different optoelectronic devices are at least two organic semiconductor laser diodes emitting at different wavelengths.

4. The element according to claim 1, wherein the at least two different optoelectronic devices are an organic solid-state laser, and an organic light emitting diode.

5. The element according to claim 1, satisfying the condition (2).

6. The element according to claim 5, which emits from the bottom thereof.

7. The element according to claim 5, which emits from the top thereof.

8. An organic semiconductor laser diode comprising a substrate, an insulating grating, a first electrode, an organic layer and a second electrode in this order, wherein the insulating grating is in contact with the first electrode.

9. A method for producing an element comprising a substrate and at least two different optoelectronic devices, which comprises fabricating the at least two different optoelectronic devices on the substrate monolithically and satisfies at least one of the following conditions (1) and (2):
   (1) the at least two different optoelectronic devices have different gratings from each other;
   (2) the at least two different optoelectronic devices comprise an organic solid-state laser diode comprising a substrate, an insulating grating, a first electrode, an organic layer and a second electrode in this order wherein the insulating grating is in contact with the first electrode.

10. The method according to claim 9, satisfying the condition (2), which comprises forming an insulating grating on the substrate and then forming organic layers for the at least two different optoelectronic devices.

11. The element according to claim 1, wherein the at least two different optoelectronic devices are three different optoelectronic devices.

12. The element according to claim 11, wherein the three different optoelectronic devices are an optoelectronic device emitting red light, an optoelectronic device emitting green light, and an optoelectronic device emitting blue light.

13. The element according to claim 1, satisfying the condition (1), wherein the at least two different optoelectronic devices have different organic gain materials from each other.

14. The method according to claim 9, wherein the at least two different optoelectronic devices are three different optoelectronic devices.

15. The method according to claim 14, wherein the three different optoelectronic devices are an optoelectronic device emitting red light, an optoelectronic device emitting green light, and an optoelectronic device emitting blue light.

16. The method according to claim 9, satisfying the condition (1), wherein the at least two different optoelectronic devices have different organic gain materials from each other.

* * * * *